United States Patent [19]

Coon

[11] 3,955,346
[45] May 11, 1976

[54] APPARATUS FOR THE RECOVERY OF COTTON FROM THE GROUND

[76] Inventor: James G. Coon, 68 Madrid Plaza, Mesa, Ariz. 85201

[22] Filed: Feb. 21, 1974

[21] Appl. No.: 444,643

[52] U.S. Cl. ................................................. 56/28
[51] Int. Cl.² ........................................ A01D 51/00
[58] Field of Search ........................................ 56/28

[56] References Cited
UNITED STATES PATENTS

| | | | |
|---|---|---|---|
| 2,730,855 | 1/1956 | Thomas | 56/28 |
| 3,105,340 | 10/1963 | Hewitt | 56/48 |
| 3,324,640 | 6/1967 | Attebery | 56/28 |
| 3,411,277 | 11/1968 | Kelly | 56/28 |
| 3,416,296 | 12/1968 | Culp | 56/28 |

FOREIGN PATENTS OR APPLICATIONS

144,662   2/1962   U.S.S.R. .............................. 56/28

Primary Examiner—Russell R. Kinsey
Attorney, Agent, or Firm—A. John Michel

[57] ABSTRACT

An apparatus and method for recovering waste cotton from cotton fields, comprising a vehicle adapted to be attached to the rear of a tractor, or to a cotton harvesting machine, and moved along the rows and furrows previously harvested; the machine comprises a plurality of pivoted frames containing adjustable stops and rotatable shafts; a rotary cylinder having collector teeth attached on its periphery; a plurality of yoke arms mounted upon the cylinder shaft containing two sets or gangs of free rolling ground wheels with cotton pick-up teeth attached on their peripheries. When the machine is moved forward, with the ground wheels rolling on the ground in the bottom and sides of the furrows, the cotton is impaled on the teeth of said wheels. The cotton is rotated upward on the teeth of the ground wheels, to a point where the teeth of the rotating cylinder removes the cotton from the teeth of the ground wheels; the upward rotation of the cylinder passes the cotton between a series of bars and the cylinder, thus extracting the extraneous unwanted materials from the cotton; the impaled cotton moves upward on the cylinder, is then removed by a revolving cylindrical brush into conveyors and is transported to the recovery machine's own storage container which is mounted on its frame.

10 Claims, 13 Drawing Figures

APPARATUS FOR THE RECOVERY OF COTTON FROM THE GROUND

This invention relates to new and useful improvements in apparatus for the recovery and cleaning of cotton which has fallen to the ground in cotton fields during the harvesting of cotton by a cotton harvesting machine.

As is well known to those skilled in the art of mechanical cotton picking, considerable amounts of cotton are knocked off the plants and onto the ground during the picking.

The cotton that has fallen to the ground normally cannot be recovered by a conventional cotton harvesting machine.

Therefore, there is a need for an apparatus and method for the recovery of this cotton, preferably, a device that may be attached to, and operated in conjunction with a conventional cotton harvesting machine, or the device may be trailed by a tractor over the rows and furrows after the cotton picking machine has completed its operation of picking.

It is an object of this invention to provide an apparatus and method for the recovery and cleaning of cotton that has fallen to the ground.

Another object of this invention is to provide an apparatus and method for the removal of extraneous materials from the cotton while it is being recovered from the ground.

It is another object of this invention to provide an apparatus that will not pick up rocks, stalks and other materials with the cotton when it is being recovered from the ground.

Still another object of this invention is to provide an apparatus and method that is not affected by the different levels of the rows and furrows and their contours, thus eliminating the necessity for the raising and lowering of the machine to various ground levels by the operator of the vehicle while it is in motion.

Another object of this invention is to provide an apparatus wherein all rotating members and functional parts cease to operate at any time the machine is stopped.

DRAWINGS

The above and other objects and advantages of my invention will become more readily apparent from the following description and the accompanying drawings wherein.

DESCRIPTION OF PREFERRED EMBODIMENT

Figure 1:
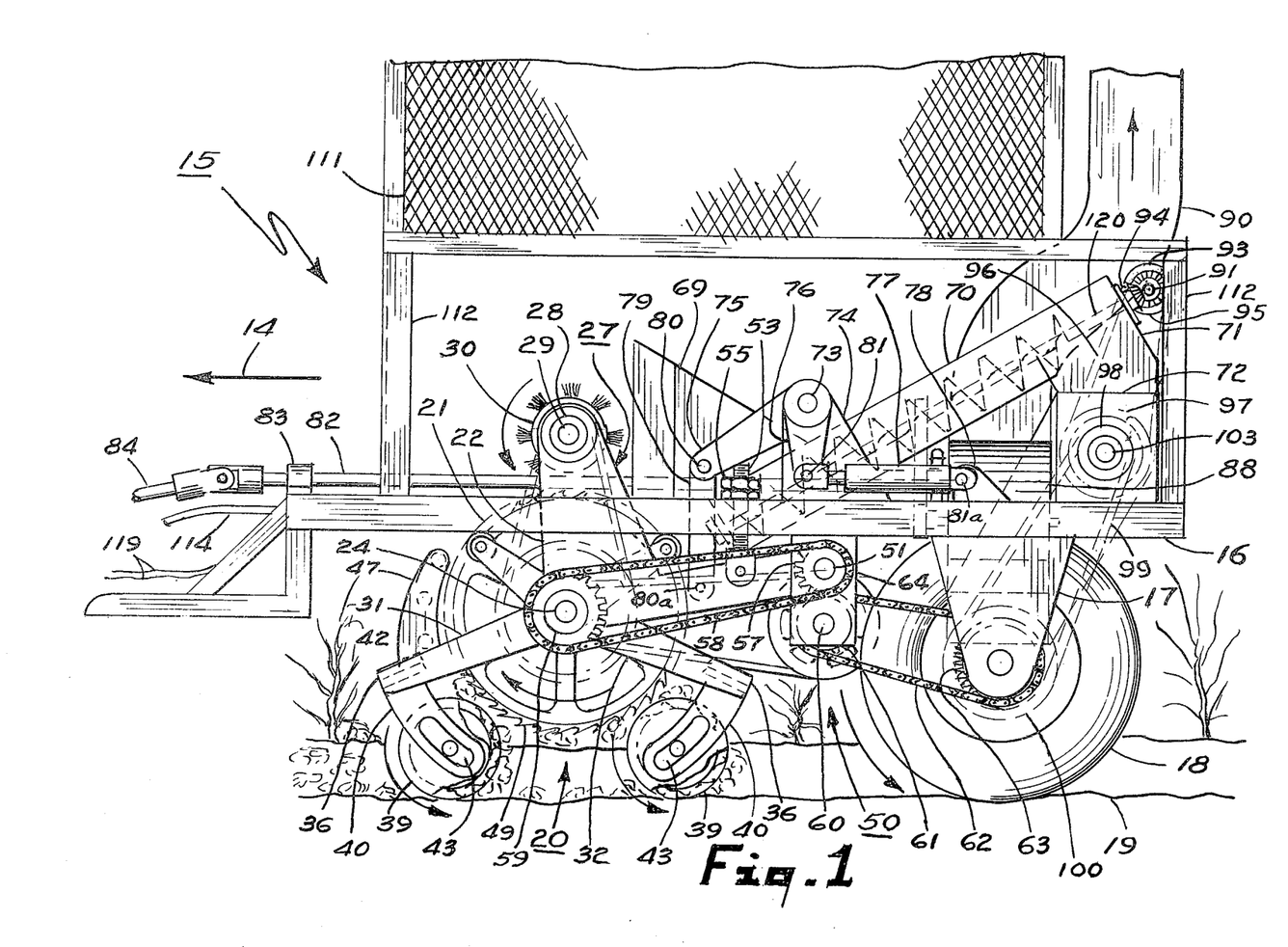
FIG. 1 is a fragmentary side elevational view of an embodiment of my recovery apparatus and method.

FIG. 1 shows a fragmentary side elevational view of the cotton recovery machine 15 as a trailing operative unit, for the recovery of cotton that has fallen to the ground during the picking operation. Ridigly mounted to the rear of frame or chassis 16 are drive wheel support brackets 17, supporting parallel wheels 18 spaced to travel in standard irrigation furrows 19.

Figure 2:
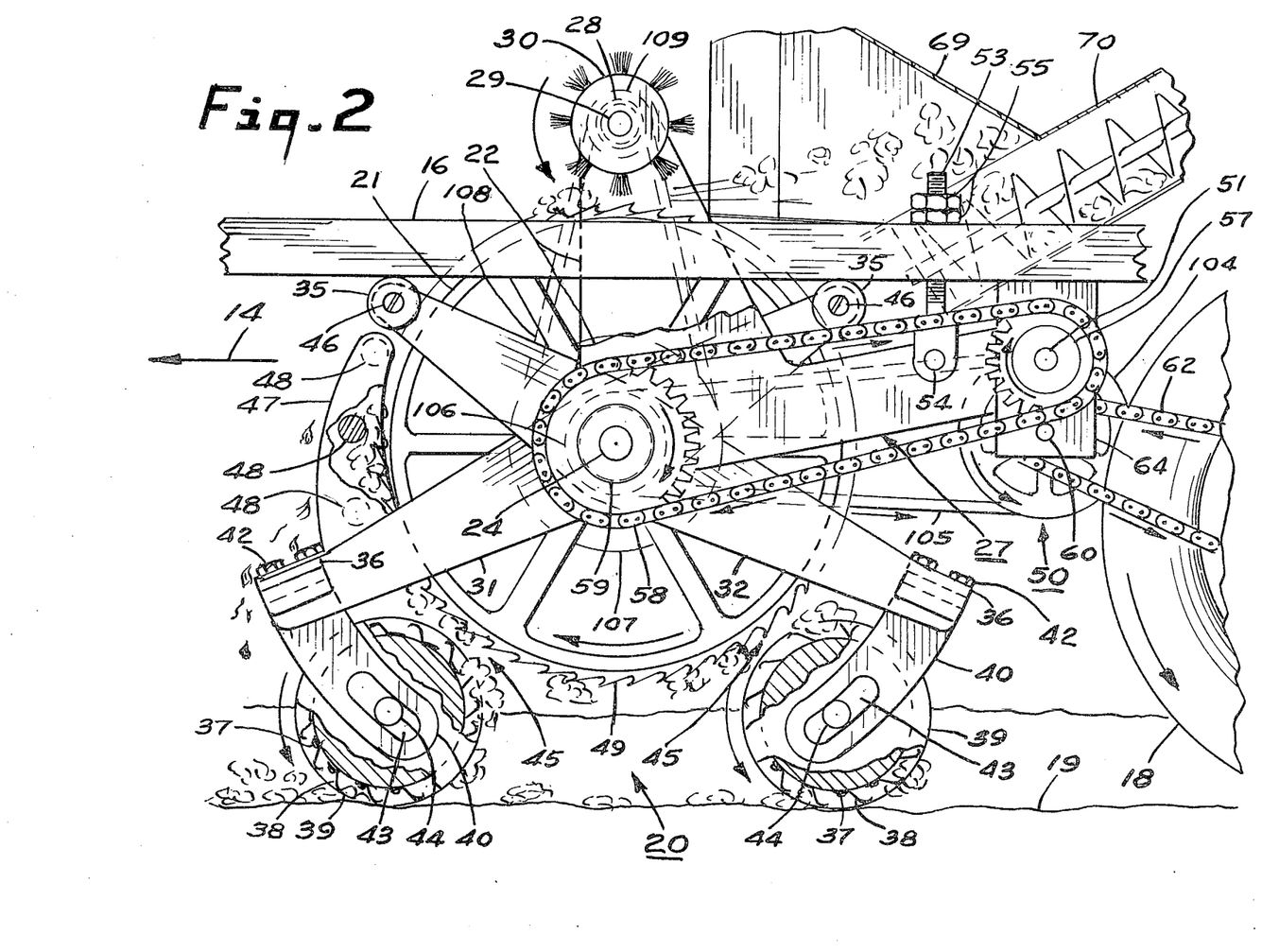
FIG. 2 is an enlarged fragmentary side elevational view of the apparatus illustrated in FIG. 1.
Figure 9:
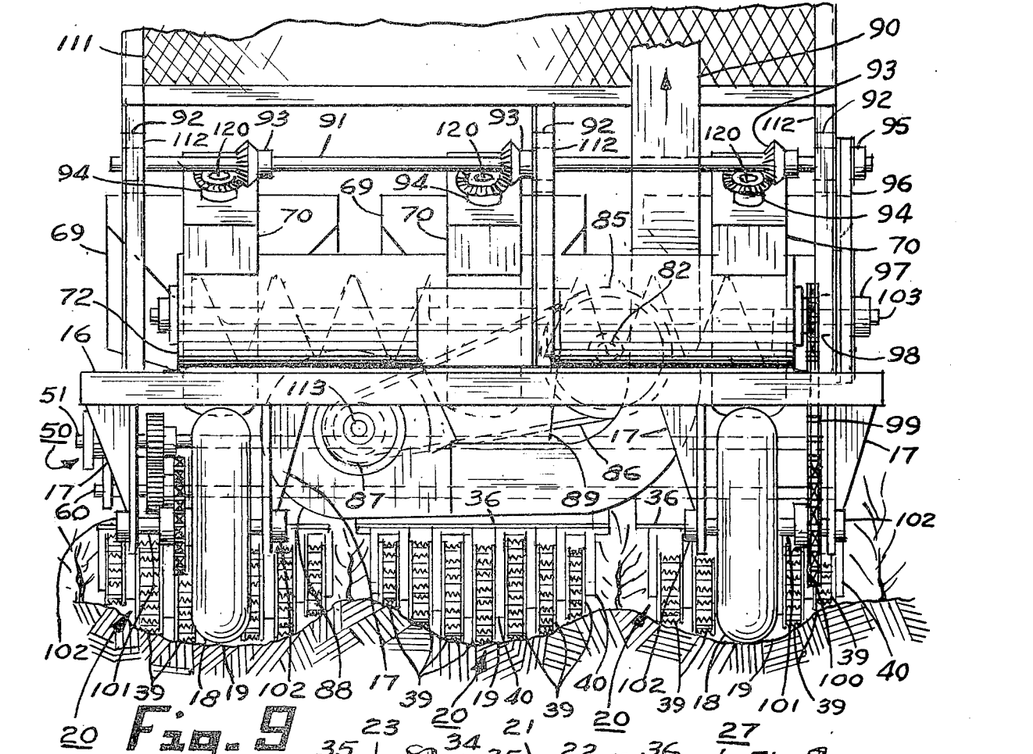
FIG. 9 is a fragmentary rear elevational view of the recovery machine, illustrating the driving mechanism for the conveyors, together with the blower and air conduit for the collected cotton.

Mounted within and below the frame 16 are a plurality of cotton pick-up assemblies 20 extending across the machine 15 from side to side, containing rotatable cylinder 21 supported by sub-frames 27 (FIG. 3) which is pivoted on drive shaft 51 journaled in bearings 52 mounted on brackets 64 (FIG. 11) of assembly 50, and suspended in position by threaded bolts 53 having locking nuts 55 with clevis ends, for adjustment of the assembleys 20. Attached to arms 22 of sub-frame 27 by pin 54 (FIG. 2) are threaded bolts 53 (FIG. 3) inserted in the holes of the brackets 56 (FIG. 3) attached to the frame 16. The nuts 55 on the threaded bolts 53 provide a means for adjusting and holding the assembly 20 with reference to the ground. Directly behind assembly 20 and attached to frame 16 by hanger brackets 64 is the driving mechanism assembly 50 (FIG. 2) for driving and reversing the direction of rotation of the collector cylinder 21 also driving and rotating the cylindrical brush 30 in an opposite direction of rotation to that cylinder 21. The revolving brush 30 removes the impaled cotton from the teeth of the collector cylinder 21, forcing the cotton into the hopper 69 attached to and supported by conveyor 70 supported by frame 16. The upper end of the inclined conveyor 70 is supported by the chute 71 attached to the horizontal screw conveyor 72 which is mounted latterly across the rear of the frame 16 (FIG. 9). On each side of the frame 16 are mounted brackets 74 (FIG. 1) supporting shaft 73 (FIG. 1) upon which are keyed a plurality of arms 75. Arms 75 are connected to link arms 79 by screws 80. The lower ends of the link arms 79 are attached to sub-frame 27 arms 22 by screws 80a (FIG. 2). On the end of shaft 73 is keyed arm 76 connected to the ram of hydraulic cylinder 77 by pin 81; the opposite end of the hydraulic cylinder 77 is connected by pin 81a to bracket which is attached to frame 16. The hydraulic cylinder 77 is actuated by fluid from the tractor system (not shown) through the line 114. Mounted on the frame 16 parallel to the sides thereof and near the center of the frame 16, is shaft 82 journaled in bearings 83 with universal joint attached to the front end of shaft 82. The universal joint 84 is connected to the power take-off of the tractor (not shown) and thus drives shaft 82. On the rear end of shaft 82 is mounted pully 85 (FIG. 9) with belt 86 to pulley 87 fixed on the blower shaft 113 of blower 88 (FIG. 9). Also mounted and attached to frame 16 are vertical supports 112 supporting the cotton storage container 111 (FIG. 1).

Figure 10:
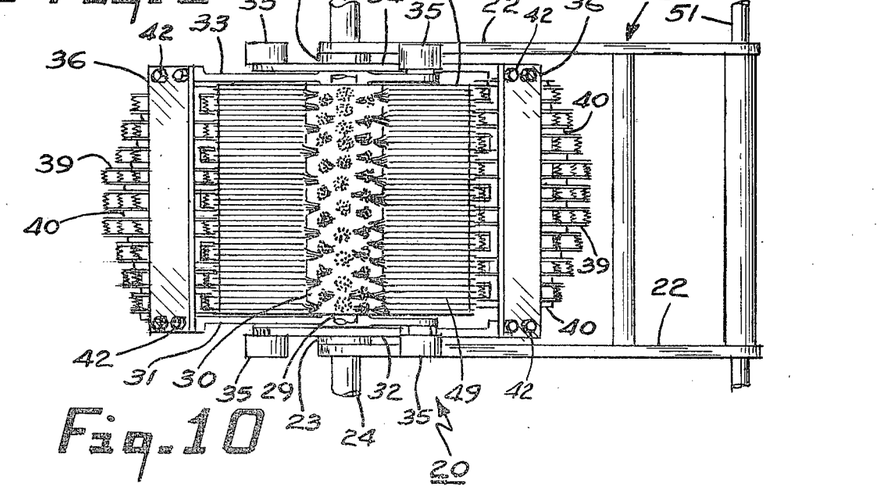
FIG. 10 is a fragmentary top plan view of the pivoted sub-frame, illustrating the assembly of the collector cylinder on the sub-frame with the ground wheels, and the cylindrical brush and supporting arms.

FIG. 2 shows an enlarged fragmentary side elevational view of assembly 20 mounted within the frame 16. In the assembly 20 is sub-frame 27 (FIG. 10); shaft 24 is journaled in bearings 23 attached to arms 22 of the sub-frame 27 (FIG. 10). Keyed to shaft 24 within the sub-frame arms 22 is a rotatable cylinder 21, containing the gin channel saw teeth 49 attached collector by screw means around the periphery of said cylinder 21. Attached to the upper part of arms 22 are bearings 28 supporting the rotatable shaft 29 upon which is keyed cylindrical brush 30. Mounted and adapted to pivot on shaft 24 (FIG. 10) are yoke arms 31, 32, 33, and 34 pivoting about shaft 24 in an angular position at each end of the cylinder 21. On the lower ends of the arms 31, 33 and 32, 34, are horizontal rectangular flat bars 36 connected to said arms by screw means 42, forming a yoke to the front and to the rear of the rotatable cylinder 21, enabling the bars 36 which are parallel to the axis of the cylinder 21 to be moved radially about the collector cylinder. Secured to the lower surfaces of the bars 36 are a plurality of U-shaped brackets 40 containing radial elongated slots 43; within and between the brackets 40 are assembled a plurality of various size cotton pick-up or ground wheels 39 (FIGS. 4 and 5) having mounted thereon a plurality of teeth 38 (FIG. 4) axially mounted and spaced on the periphery of the ground wheels and secured thereto by screws 37. The shafts 44 of the ground wheels 39 extend into the radial elongated slots 43 (FIGS. 2 and 5) of brackets 40 on each side of the ground wheels 39, thus providing a means for holding the wheels in the brackets 40 and enabling the ground wheels 39 to rotate and rise and fall freely and independently of one another in the radial slots 43 of bracket 40 (FIG. 2) while rolling on the ground. The radial elongated slots 43 provide a means for the wheels 39 to rise and fall as they roll over the different contours of the surface of the furrows 19. A correct space or distance 45 (FIG. 2) is maintained between the collector cylinder teeth 49 (FIG. 2) the teeth 38 (FIG. 4) of the ground pickup wheels 39 (FIG. 4), when the shafts 44 of the wheels 39 are at any position in the elongated slots 43, or when the wheels 39 are moved about the cylinder radially by the yoke arms 31, and 32 for the clearance of rows in the field and adjustment purposes. On the upper ends of the yoke arms 31, 32, 33 and 34 (FIG. 10) are rollers 35 attached and secured by screws 46. The rollers 35 are held in contact with the lower surface of the horizontal frame 16, by the weight of the arms 31, 32, 33, and 34 (FIG. 10) and wheels 39 at the opposite ends. The rollers 35 and arms 31 and 32 (FIG. 2) pivoted on shaft 24 supporting radial slotted bracket 40 on opposite ends provide an adjustment of the radial slots 43 to shaft of pick-up wheels 44 (FIG. 2) leg screws 53 and nuts 55 (FIG. 2) raising or lowering assembly 27 (FIG. 2) causing a scissor action to arms 31 and 32 (FIG. 2) raising and lowering radial slotted brackets 40 with reference to the ground without raising or lowering the pick-up wheels 39 (FIG. 2) while recovering the cotton from the ground. Directly above the front brackets 40 on the upper surface of the bar 36 and at its end are mounted brackets 47 secured by screws 42, supporting the cleaner bars 48 extending axially across the face and parallel to the horizontal axis of the collector cylinder 21. The bars 48 provide a means for extracting the extraneous materials from the cotton as the impaled cotton passes between the bars 48 and the teeth of the cylinder 21. The cotton impaled on the teeth of the cylinder 21 is then brushed from the teeth of the cylinder 21 into the hopper 69 and conveyor 70 by the cylindrical brush 30 fixed to and supported by shaft 29 journaled in bearings 28 (FIG. 1) attached to sub-frame arms 22. The upper parts of arms 22 of the sub-frame 27 are partially removed for clarity. The trailed unit support wheel 18 with its sprocket 63 and chain 62 drives sprocket 61 rotating shaft 60 in bearings 52 of assembly 50 (FIG. 11), thus rotating the gears 65 and 66; the gear 66 reverses the direction of rotation of shaft 51; the sprocket 57 with chain 58 drives the sprocket 59 on shaft 24 with collector cylinder 21 in a clockwise rotation (FIG. 1). The lower shaft 60 of the assembly 50 (FIG. 11) rotates in bearings 52 with pulley 68 (FIG. 11) in the same direction of rotation to that of the support wheels 18, for driving the cylindrical brush 30.

Figures 3, 4:
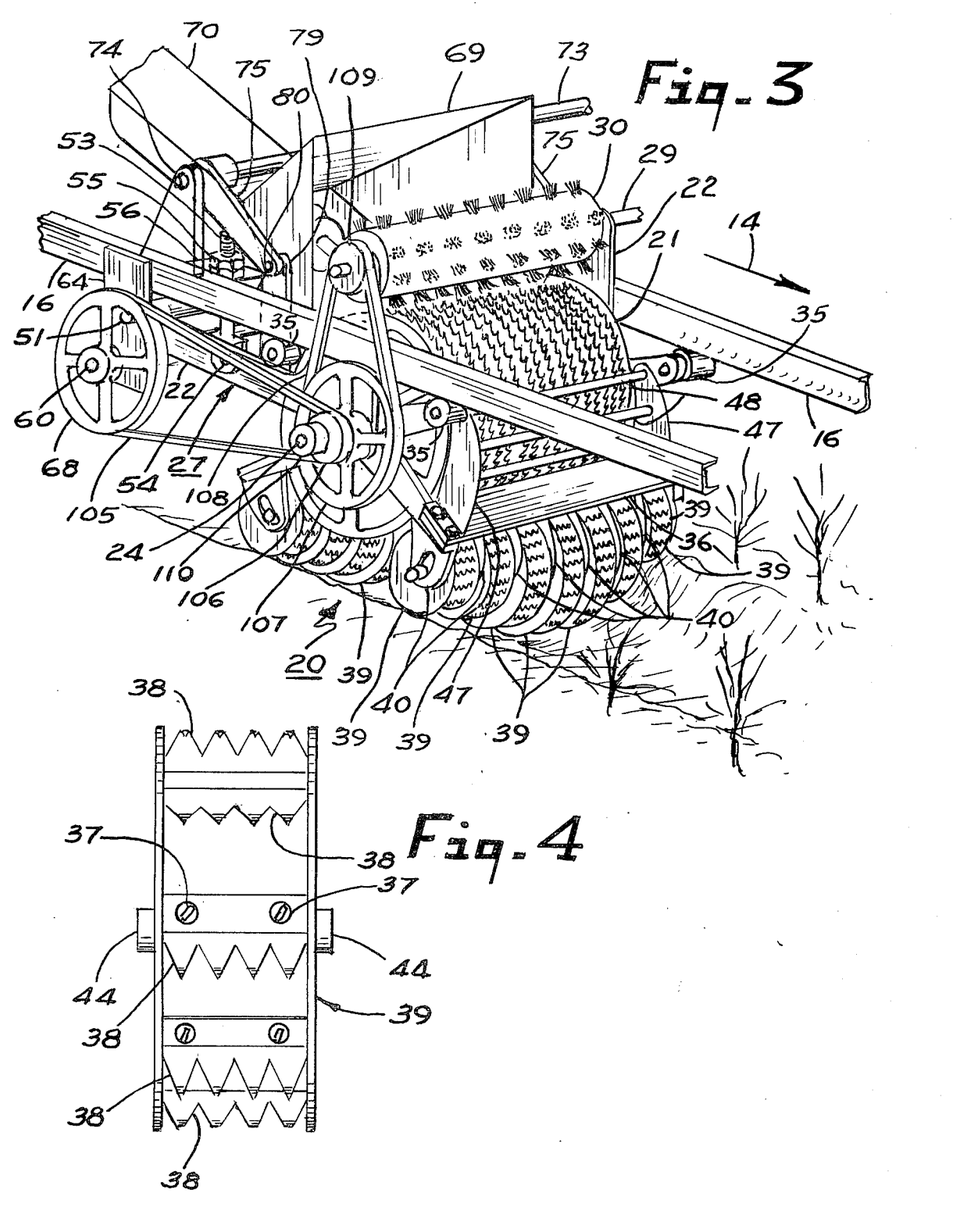
FIG. 3 is a fragmentary perspective view of a preferred embodiment of my invention, illustrating the brush driving mechanism, and the ground wheels positioned in a furrow.
FIG. 4 is a front view of a single ground wheel, illustrating the teeth attached to the periphery and a shaft extending on each side.

FIG. 3 is a fragmentary perspective view of the assembly 20 of the machine 15, positioned in the furrow 19, illustrating the drive mechanism for rotating the brush 30, and showing hopper 69 and conveyor 70. On the end of the drive shaft 60 is keyed pulley 68 with belt 105 to pulley 106 attached and fixed to larger pulley 107, held in position on shaft 24 by collar 110, adapted to rotate on shaft 24 in the opposite direction of rotation to which the shaft 24 is rotating. Mounted on pulley 107 is belt 108 driving the small pulley 109 keyed to shaft 29, for driving the cylindrical brush 30 which brushes the cotton from the teeth of the cylinder 21, and into the hopper 69 and conveyor 70.

FIG. 4 is a front view of one of the cotton pick-up or ground wheels 39 with teeth 38 which are axially mounted and radially spaced on the periphery of the wheels, and secured by screws 37. The teeth 38 are pointed in the direction of rotation. Axle or shaft 44 extending on each side of the wheels.

Figure 5:
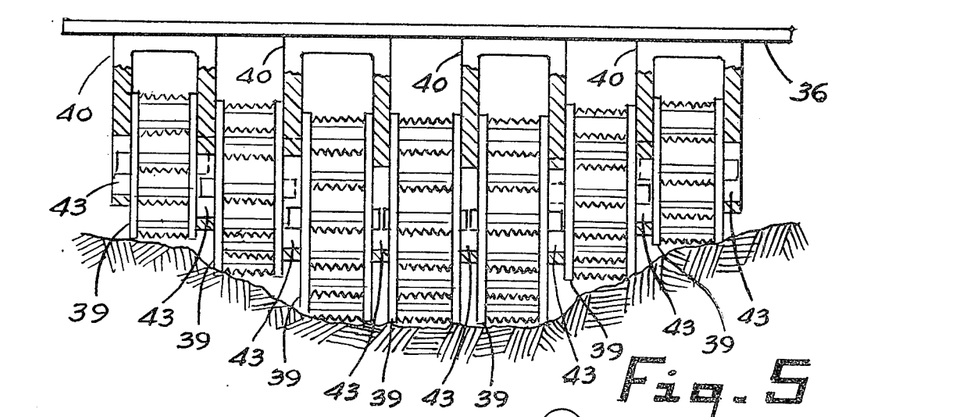
FIG. 5 is a front elevational view of a gang of ground wheels, illustrating their assembly in the elongated slots of the brackets.

FIG. 5 is a front elevational view of the ground wheels 39 assembled in the brackets 40 which are attached to horizontal bar 36. This figure illustrates the action of the ground wheels 39 in following the contour of the furrows 19 of the cotton field, showing sectional views of the radical elongated slots 43, with parts of the arms removed for a clearer view of the assembled ground wheels 39 in the elongated slots of the brackets 40.

Figures 6, 7, 8:
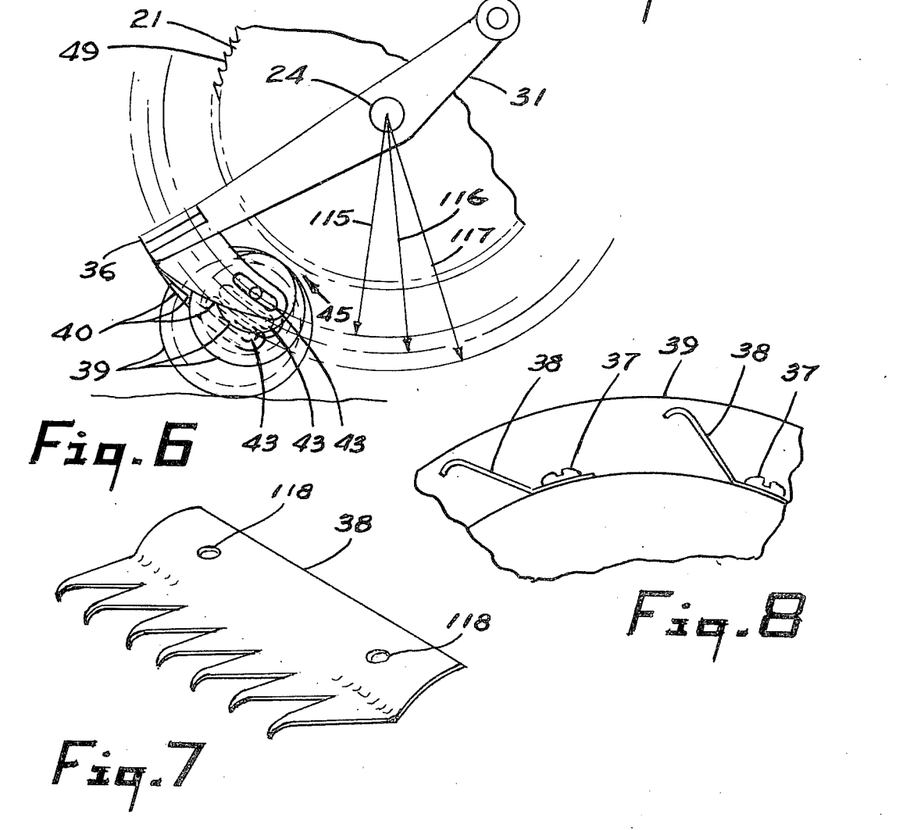
FIG. 6 is a partial side view of the rotatable cylinder and freely rolling ground wheels, illustrating the different radii for the elongated slots in the wheel-supporting brackets.
FIG. 7 is a perspective view of the ground or pick-up wheel teeth, illustrating the angular flat teeth with curved points.
FIG. 8 is a partial side view of a ground wheel with a side flange removed, illustrating the spacing and the axial positioning of the collecting teeth on the periphery of the wheels.

FIG. 6 is a diagrammatic side view showing the radii 115, 116 and 117 of the radial slots in the arms of the brackets 40; and the fixed space or distance 45 between the teeth 49 of the collector cylinder 21; and the different diameters of the ground or pick-up wheels 39. The space or distance 45 between the teeth 49 of the collector cylinder 21, and the different diameters of the ground or pick-up wheels 39, is maintained at all times, even the different diameter ground or pick-up wheels 39 may be at different locations in their radial slots 43 of the brackets 40.

FIG. 7 is a perspective view of the ground wheel teeth 38, illustrating the flat angular teeth 38 as being in alignment with one another on a plane, as well as the mounting holes 118. The sharp points of the teeth are curved toward the outside of the included angle of the plate. The adjacent side of the angle opposite the teeth is formed to mate with the contour of the diameters of the ground wheels 39.

FIG. 8 is a side view of a segment of the ground wheel 39 with the near side flange removed, showing the axial mounting and spacing of the teeth 38 on the periphery of the ground wheels 39 secured by screws 37.

FIG. 9 is a fragmentary rear elevational view of the cotton recovery machine 15. The ground wheels 39 and the parallel support wheels 18 are positioned on the furrows 19. Shown are the driving mechanism for conveyors 70 and 72, blower 88 and the drop chute 89 attached to conveyor 72 containing a center feed auger. The lower end of the drop chute 89 is connected to the air conduit 90 attached to blower outlet 88. Mounted on vertical supports 112 are bearings 92, supporting the rotatable shaft 91 upon which are keyed miter gears 93. Mating miter gears 94 are keyed to the ends of the auger shafts 120 of conveyors 70. The rear right hand support wheel 18 is mounted and fixed to shaft 101; rotating in bearings 102; keyed to shaft 101 is chain sprocket 100 with chain 99 driving sprocket 98 which is keyed to the auger shaft 103, between the right end of conveyor 72 and pulley 97. Upon the right end of the auger shaft 103 is keyed pulley 97, with belt 96 to pylley 95 fixed to shaft 91 rotating miter gears 93 and 94 mounted on the ends of the auger shaft 120 driving the augers of the conveyors 70.

FIG. 10 is a fragmentary top plan view of the assembly 20, illustrating the sub-frame 27 (FIG. 1) pivoted about the shaft 51, and the yoke arms 31, 33, and 32, 34, pivoted on the shaft 24 at each end of the cotton collecting cylinder 21. Also shown are the two horizontal parallel bars 36, each fixed to the ends of the yoke arms supporting the brackets 40 and the ground wheels 39, to the front and to the rear of the cylinder 21, with the cylindrical brush 30 parallel to and in alignment with the cylinder 21.

Figure 11:
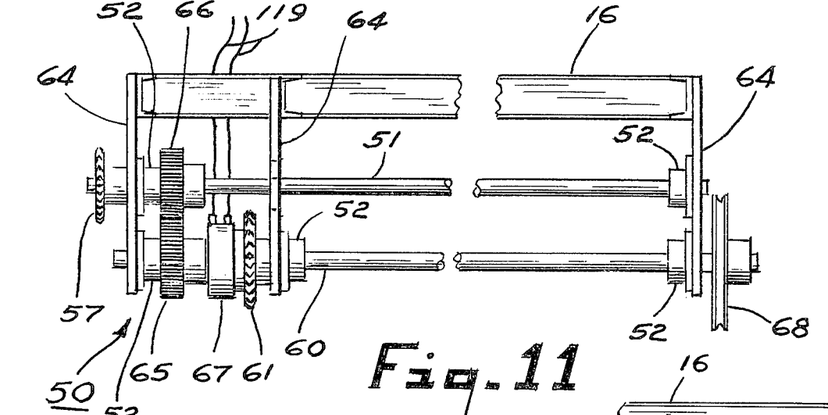
FIG. 11 is a rear elevational view of the assembly of the drive mechanism, with shafts, gears, clutch and sprockets for driving the cylinder and brush.

FIG. 11 is a fragmentary side elevational view of the drive assembly unit 50 (FIG. 1) extending across the machine 15 from side to side. Attached to frame member 16 are two lateral brackets 64 supporting shafts 51 and 60 rotatable in bearings 52 attached to brackets 64. Mounted on the lower shaft 60 is spur gear 65 attached to the freely rotatable member of the magnetic clutch 67 when it is not energized. The opposite part of the clutch 67 is integral with drive sprocket 61 keyed to shaft 60. On the opposite end of shaft 60 is mounted drive pulley 68. The upper shaft 51 is rotatable in bearings 52; keyed to shaft 51 is spur gear 66 in mesh with spur gear 65. Mounted on the left side of the shaft 51 is drive sprocket 57; also shown are conductor wires 119 to the magnetic clutch 67.

Figures 12, 13:
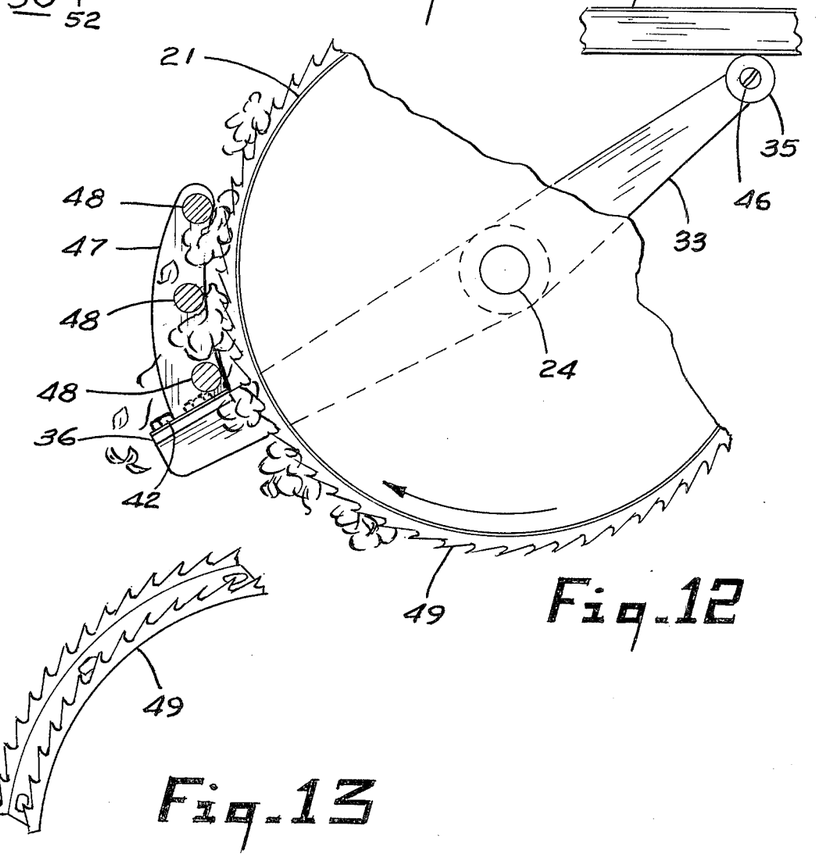
FIG. 12 is a partial end view of the rotatable cotton gathering or collector cylinder, illustrating the cleaner bars and supporting brackets attached to the yoke.
FIG. 13 is a perspective view of the channel saw teeth used on the rotatable cylinder, for removing the cotton from the teeth of the ground or pick-up wheels.

FIG. 12 illustrates the method of cleaning the cotton while it is being recovered from the ground. When the collector cylinder 21 is rotated clockwise, the recovered cotton is impaled on its teeth 49 after being removed from the teeth 38 of the ground wheels 39. The teeth 49 pass the cotton between the cleaner bars 48 and the teeth 49 of the cylinder 21. The bars 48, supported by brackets 47, function to restrict the passage of burs and stems which are pulled from the cotton as it passes the bars 48. The unwanted materials thus drop to the ground, and the cotton remains on the teeth of the cylinder 21, and is then removed by the cylindrical brush 30.

FIG. 13 is a perspective view of the channel saw teeth 49 used on cylinder 21.

The operation of this invention is substantially as follows: Assuming that the cotton recovery machine 15 is attached to the rear of the tractor, that the wires 119, flexible hydraulic line 114, drive shaft 84 and universal joint are connected to the tractor, which is in an appropriate position for beginning the cotton recovery operation. The operator of the vehicle lowers the assembly 20 (FIG. 1) toward the ground by releasing the oil pressure in the hydraulic cylinder 77 (FIG. 1) until the ground or pick-up wheels 39 touch the ground. The nuts 55 (FIG. 1, center) are then adjusted on the bolts 53 to lower the assembly 20 a little further to the ground, at the same time lowering the brackets 40 (FIG. 1, bottom), until the shafts 44 of the ground wheels 39 are at a central location in the elongated slots 43, while the ground wheels are resting on the ground in the furrows 19. At this point, the ground wheels 39 are able to roll, rise and fall freely in the elongated slots 43, while rolling on the different contours of the surface of the ground in the furrows 19, without any weight or pressure from the assembly 20. The operator of the vehicle then locks the nuts 55 together on the threaded bolts 53, which provides fixed stops to the frame 16, when lowering the assemblies 20 with ground wheels 39 to the ground for the recovery operation. The operator next actuates an electric switch (not shown) on the tractor energizing electric clutch 67 (FIG. 11) of the recovery machine 15, at the same time actuating a lever for the power take-off drive of the tractor (not shown) driving the shaft 82 (FIG. 1) nd the pulley 85 with belt 86 and pulley 87 (FIG. 9). This actuates blower 88 which produces a sufficient volume of air flow in the conduit 90. As the machine moves forward in the direction of the arrow 14 (FIG. 1), the left one of the rear support wheels 18 drives the shaft 60 of the assembly 50, driving the brush 30 (FIG. 2) in the same direction of rotation as that of the wheel 18. When the clutch 67 (FIG. 11) is energized, the shaft 60 drives the gears 65 and 66 reversing the direction of rotation of the shaft 51 with the collector cylinder 21 in a clockwise direction. The right support wheel 18 (FIG. 9) drives the augers in the conveyors 70 and 72. The pick-up or ground wheels 39 are not driven, but roll on the ground in the furrows independently of the machine 15. As the machine 15 moves forward in the direction of the arrow 14, the ground wheels 39 contact the cotton that is on the ground impaling the cotton on their teeth 38. As the ground wheels rotate, the cotton impaled on the teeth 38 moves upward to a point where it is removed by the faster moving teeth of the collector cylinder 21. The cotton impaled on the teeth of cylinder 21, rotating upwardly passes unimpedely between the bars 48 (FIG. 12) and the teeth 49 on the cylinder 21. The bars 48 prevent the passage of burs an stems and other unwanted objects while the cotton is pulled from them, as shown on FIG. 12 the cylinder 21 with the impaled cotton on the teeth thereof continues rotating and propels the cotton under the revolving cylindrical brush 30 which brushes the cotton from the teeth of the cylinder 21 into hopper 69 and conveyor 70. The cotton is thus conveyed to the upper end of the conveyor 70 dropping in chute 71 and into the conveyor 72. Conveyor 72 has a center feed auger, moving the cotton to the chute 89, dropping it into the air stream of the blower 88 (FIG. 9) and thence transporting it pneumatically in the conduit 90 to the storage container 111. When the machine arrives at the end of the rows and furrows that were thus cleaned of ground cotton, the operator of the vehicle actuates the electric switch on the tractor (not shown) deenergizing the magnetic clutch 67, thus stopping the rotation of the cylinder 21 and of the cylindrical brush 30. The operator then opens a hydraulic control valve (not shown) forcing the hydraulic fluid through the flexible line 114 to the hydraulic cylincer 77, thus raising the assemblies 20 to clear the rows, for the positioning of the cotton recovery machine on subsequent rows and furrows for the recovery of cotton that has fallen to the ground during the previous picking operation.

It will be understood that various changes may be made in the arrangement of the parts of this invention, and in their number and composition without departing from the spirit and scope of the invention as claimed in the appended claims.

I claim:

1. A trailer apparatus for recovering cotton from the ground comprising:
   a. a frame having wheels thereon for movably supporting said frame;
   b. a sub-frame pivotably mounted on said frame and having a spaced pair of arms which extend longitudinally of said frame and are vertically movable in radial paths;
   c. adjustment means connected between said frame and said sub-frame for adjustably limiting the downward vertical movement of the arms of said sub-frame;
   d. a shaft rotatably journaled between the arms of said sub-frame and vertically movable therewith;
   e. a collector cylinder fixed on said shaft for rotating and vertically moving therewith, said collector cylinder having cotton impaling teeth on the periphery thereof;
   f. a pair of yoke frames rotatably journaled on said shaft and each having a bar which is parallel to said shaft, said yoke frames disposed to position their respective bars below said shaft and on opposite sides thereof adjacent the periphery of said collector cylinder;
   g. roller means on each of said pair of yoke frames and in engagement with the underside of said frame for producing a scissor movement of said yoke frame about said shaft in response to vertical movements thereof with that scissor movement resulting in opposite movements of the bars of said yoke frames in radial paths about the periphery of said collector cylinder;
   h. a plurality of cotton pick-up wheels carried oon each of the bars of said yoke frames and maintained thereby in contact with the ground and at a predetermined distance from the periphery of said collector cylinder;
   i. means for mounting said cotton pick-up wheels to the bars of said yoke frames so that said pick-up wheels are free to roll over the ground and follow the contours thereof;
   j. each of said cotton pick-up wheels having a plurality of teeth on the periphery thereof for picking cotton off of the ground and moving that cotton into the proximity of the teeth of said collector cylinder;
   k. a cylindrical brush rotatably journaled between the arms of said sub-frame and located above said shaft adjacent the periphery of said collector cylinder;
   l. drive means on said frame and coupled to said collector cylinder and to said brush to rotate said collector in a direction opposite to the rotation of said cotton pick-up wheels and to rotate said brush in a direction opposite to the rotation of said collector cylinder so that cotton picked up by said pick-up wheels will be removed by and become impaled on the teeth of said collector cylinder and that impaled cotton will be removed from the teeth of said collector cylinder by said brush; and
   m. means mounted on said frame for receiving the cotton removed from said collector cylinder by said brush.

2. A trailer apparatus as claimed in claim 1 and further comprising at least one cleaner bar fixedly carried on one of said pair of yoke frames for positioning adjacent the periphery of said collector cylinder and parallel thereto, said cleaner bar disposed to dislodge foreign material from the cotton that is impaled on the teeth of said collector cylinder as that cotton is moved from said pick-up wheels toward said brush.

3. A trailer apparatus as claimed in claim 1 and further comprising:
   a. linkage means mounted on said frame and connected to said sub-frame, said linkage means operable to pivotably move said sub-frame toward and away from said frame; and
   b. power means mounted on said frame and coupled to said linkage means for operation thereof.

4. A trailer apparatus as claimed in claim 1 wherein said plurality of cotton pick-up wheels are of various diameters so that when said cotton pick-up wheels are operating in irrigation furrows said plurality of cotton pick-up wheels will substantially conform to the contour thereof.

5. A trailer apparatus as claimed in claim 1 wherein said means for attaching said plurality of cotton pick-up wheels comprises a plurality of brackets affixed on the bars of said pair of yoke frames, each of said brackets having a spaced pair of arms for straddling one of said plurality of cotton pick-up wheels with each of those arms having a radial slot forward therein for movably carrying the axles of that one of said cotton pick-up wheels.

6. A trailer apparatus as claimed in claim 1 wherein each of said plurality of cotton pick-up wheels is provided with a pair of ground engaging circular flanges mounted laterally oppositely thereon, said flanges concentrically mounted and extending beyond the teeth mounted on the periphery of said pick-up wheel to space the teeth above the ground.

7. A trailer apparatus as claimed in claim 1 wherein the teeth mounted on said cotton pick-up wheels each extend angularly from the periphery of its respective one of said cotton pick-up wheels in the direction of rotation thereof when that one of said cotton pick-up wheels is rolling on the ground, each of said teeth curving inwardly at its free end and terminating in a point.

8. A trailer apparatus as claimed in claim 1 wherein said plurality of cotton pick-up wheels carried on the bar of each one of said pair of yoke frames are grouped in sets with each of those sets being positionable for operation in adjacent irrigations furrows formed in the ground.

9. A trailer apparatus as claimed in claim 1 wherein said drive means causes the said collector cylinder to rotate with a peripheral speed that is faster than that of said plurality of cotton pick-up wheels.

10. A trailer apparatus as claimed in claim 1 wherein said drive means is coupled to one of the wheels of said frame so that rotation of that wheel will operate said drive means.

\* \* \* \* \*